United States Patent Office 3,591,554
Patented July 6, 1971

3,591,554
CURABLE POLYEPOXIDES PRODUCED BY METAL HYDRIDE OR ALKOXIDE CATALYST
René Jan Al, Houston, Tex., assignor to The Dow Chemical Company, Midland, Mich.
No Drawing. Filed Sept. 26, 1968, Ser. No. 762,974
Int. Cl. C08g 30/00, 30/10
U.S. Cl. 260—47
2 Claims

ABSTRACT OF THE DISCLOSURE

Reaction is brought about between a polyepoxide of relatively low epoxide equivalent weight and epihalohydrin, or between a bisphenol and epihalohydrin, to obtain high epoxide equivalent weight polyepoxide resins of remarkable purity, in a reaction employing an alkali metal hydride or an alkali metal alkoxide as catalyst.

BACKGROUND OF THE INVENTION

Field of the invention

Cured epoxy resins are well known as "high performance" resins, and it is well known to prepare them by curing curable poly-1,2-epoxyalkyl polyepoxide resins having an average of more than one such 1,2-epoxyalkyl groups per molecule. It is desired, in many applications, to have a curable polyepoxide resin of relatively high epoxy equivalent weight. Hitherto, attempts to prepare such materials have been handicapped by the development of strong color, usually brown or nearly black, in the polyepoxide, a color which has persisted into the cured epoxy resin.

The prior art

The art nearest the present invention known to the inventor involves the conventional preparation of polyepoxide substances by the induction of a reaction as, for example, between a bisphenol and epihalohydrin or between the diglycidyl ether of a bisphenol and further bisphenol employing, for example, an alkali metal hydroxide as curing catalyst. This well-known preparatine route is intended to follow the course of reaction:

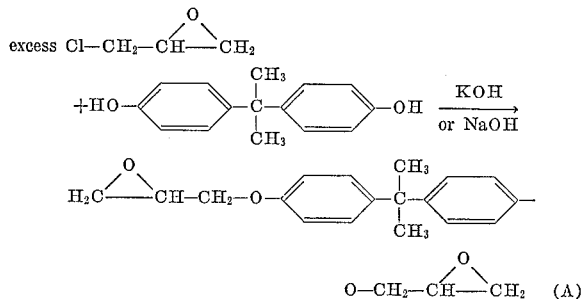

In commercial processes, the component A is never completely pure when formed and the most common impurity is incomplete epoxidation which results in the chlorohydrin group, e.g.

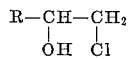

When it has been desired, starting with the impure product of the prior art bearing chloride moieties upon the etherifying hydroxyalkyl groups where 1,2-epoxy substitution is desired, the attempt has been made to produce polyepoxides curable to epoxy resins of higher starting molecular weight, two general routes have been followed. In one, the epoxy resin of relatively low epoxy equivalent weight is reacted with a difunctional phenol such as a bisphenol in the presence of an alkali metal hydroxide catalyst such as NaOH, KOH, or LiOH. When the attempt to prepare high epoxy equivalent weight resins follows this course, portions of the catalyst predictably react with undesired chlorides, thus stripping the resin of much if not perhaps all its undesired chloride substitution, but in its place leaving in the resulting resin alkali metal chloride salts which, in the situation, are insoluble. Therefore, the preparation of a resin of high purity and free from—frequently objectionable—alkali metal chlorides requires that the resulting resin be filtered. In view of the relatively high viscosities involved, such filtration is not desirable. Moreover, even small remaining unremoved portions of chloride, appearing in the cured epoxy resin product ultimately, can render the resulting impure product corrosive to, for example, printed metal electric circuits such as are commonly printed on epoxy resin boards, and the like, to such point that the resin is inadmissible.

In another course of reaction, starting with a polyepoxide of low epoxy equivalent weight and a diphenol, the reaction has been carried forward under the influence of a tertiary or quaternary amine catalyst such as N-methylmorpholine or benzyl trimethyl ammonium chloride. In this latter pattern of reaction, insoluble salts are not formed, but the resins that result have properties inferior to those prepared by the employment of alkali metal hydroxide catalysis. The exact reasons for such inferior performance are not fully known, but, for example, dispersion of filler or pigment or the like in the resulting polyepoxide prior to cure is made much more difficult and, generally, less satisfactory.

DESCRIPTION OF THE PRESENT INVENTION

According to the present invention, curable polyepoxide resins are prepared in high epoxy equivalent weight without subsequent necessity to filter or otherwise specially treat the product, having very little color or being practically colorless, free or substantially free of chlorine, by carrying out a reaction between epihalohydrin and bisphenol or between bisphenol and diglycidyl ether of a bisphenol, under anhydrous conditions and under inert gas blanket, in the presence of a catalyst which is either an alkli metal or alkaline earth metal hydride or an alkali metal or an alkaline earth metal lower alkoxide, or an alkali metal aryloxide.

The reactions of the present invention are believed to go forward according to substantially the same general reaction scheme as is above shown except that catalyst, instead of KOH or NaOH, is KH, NaH, KO-lower alkyl or NaO-lower alkyl, or their alkaline earth analogues or an alkali metal aryloxide such as sodium phenate or sodium naphthenate.

Throughout the instant specification and claims, an alkali metal is sodium, potassium, or lithium; an alkaline earth metal is magnesium, calcium, strontium or barium; a lower alkyl group also in its combined name form as in "lower alkoxide," is an alkyl of from 1 to 4, both inclusive, carbon atoms, and "aryl" imports the sense of phenyl or naphthyl. However, despite the seemingly small distinction in pathway of reaction, the resulting product of this invention differs importantly from the product of the prior art.

In practicing the present invention, one follows precisely the pathway, in all its various forms, above indicated for the production of a polyepoxide curable to obtain an epoxy resin except that, instead of alkali metal hydroxide, one employs a lower alkoxide or metal hydride of an alkali metal or an alkaline earth metal, or an alkali metal phenoxide. As far as the desirability of the resulting product is concerned, the catalyst substances here newly disclosed for this use can be regarded as equivalents. Between them a choice can be based upon such considerations as price, availability, safety and the like.

When practicing the present invention, one obtains a polyepoxide of high epoxy equivalent weight, without necessity to filter the final products, employing catalyst in lower over-all concentrations, with catalyst concentration independent of the hydrolyzable chloride content of the resin, to obtain a product with good stability and an excellent vehicle for pigment dispersion.

Although either the lower alkoxide or the hydride catalyzes the reaction to prepare a polyepoxide in an elegant manner, they are both also very reactive substances. For this reason, especially when catalyzing the reaction of the present invention, the substances themselves and, in particular, the contents of the reactor vessel in which the reaction is being carried out, should at all times be maintained under anhydrous conditions and under a blanket of gas that is inert as to reactivity with the employed substances. The maintenance of anhydrous conditions is well-known, and the provision of an inert gas blanket is readily carried out by supplying, from any convenient source, a blanket of nitrogen gas, or one of the noble gases such as helium, neon, argon, krypton, and the like. If desired, other inert gases can also be employed. It is noted in this context that while hydrogen is a gas that is inert to the reactants present in the instant situation, because of the hazard almost always present in its employment, the use of hydrogen is not usually preferred.

In carrying out the present invention, the reactant substances are supplied to the reaction vessel in previously dried form. The drying of the reactant substances is readily carried out in any of various fashions, such as the addition of the substances to the reactor vessel, together with solvent which can be an inert aromatic solvent, and distillation, optionally with addition of further solvent, to carry water away as an azeotrope with the said solvent; solvent can also then be stripped away after having removed the water as an azeotrope, leaving the satisfactorily dried reactant substances together, reaction between them awaiting only catalysis. Alternatively, the reactant substances can be supplied separately to their own reaction vessels and, similarly, separately dried as by azeotropic distillation followed by removal of any solvent added as an azeotrope material.

In other well-known drying techniques, the reactant substance in liquid form can be passed through, or held in contact with, a bed or other amount of an anhydrous crystalline substance which, by accepting water of hydration very securely, dehydrates the reactant substance. When employing this technique, it will be convenient to have the dehydrating material in the bottom of the storage vessel or the like, and, when desired, to remove reactant substance from a point in the vessel well above the level of the dehydrating agent. Or, of course, dehydrating agent is also conveniently removed by filtration.

In another and related technique, the reactant substance to be dried is placed in a vessel and warmed, as by heating jacket or mantle or the like, and there is bubbled through it a gaseous substance which is inert under reacting conditions, and is dried by passing through a dehydrating unit prior to introduction into the reactant substance, and, as it bubbles therethrough takes with it water in the form, again, of an azeotrope (in this instance having a much lower total condensation temperature), and ultimately drying the reactant substance.

While it is desired that all reactant substances be well dehydrated prior to their introduction into the reaction of the present invention, small portions of remaining water are wasteful of catalyst but not impossibly objectionable. Water removal should be thorough but need not be exhaustive. Such treatment is, of course, usually implied in the term "anhydrous" or "dehydrated."

It will usually be convenient to supply the catalytic lower alkoxide or hydride to the reaction site in solution. In this situation, any organic solvent for the indicated material can be employed and such solvent should also be dried prior to its employment. For example, dried tetrahydrofuran is employed with good results as a solvent for metal hydride, whereas anhydrous lower alkanol, optionally of alkyl group conforming to that in the metal lower alkoxide catalyst, is also satisfactory.

In light of the foregoing observations and descriptions, the further practices of the present invention essentially duplicate those of the prior art. The reactant substances are brought together, reaction between them is catalyzed by at least one of the catalysts herein disclosed, by art procedures of combining the reactants together with one another and with catalyst optionally in solution, mixing and stirring all together, and heating the resulting mixture to induce reaction. Required catalyst concentration tends to be lower in the practice of the present invention than in the prior art; the employment of higher amounts, such as prior art amounts of catalyst is optional.

As product of the present invention there is obtained a polyepoxyalkyl product having an average of more than 1,2-epoxyalkyl groups per molecule, of high molecular weight and related desirable properties but of light color or colorless, and with no need for subsequent filtration.

The best methods now known to the inventor of practicing the present invention are now set forth.

It is expressly mentioned that the examples which follow are not intended to be illustrative of the scope of this invention. Thus, for example, no specific embodiment is set forth using an alkaline earth metal hydride or alkoxide, or employing any alkali metal aryloxide. These catalytic substances are fully operative and their products of this invention distinguish over those of the prior art; but for various reasons they are not regarded by the inventor as his best modes of practicing this invention, and they are therefore not here exemplified.

EXAMPLE 1

In a reaction vessel equipped with stirring means, heating means, supply line for gaseous nitrogen, temperature indicating means, and reflux condenser with condensate trap, there were provided 110 grams of bisphenol A dissolved in 390 grams of the diglycidyl ether of bisphenol A, the latter being a curable polyepoxide of epoxy equivalent weight of approximately 180, and having a content of hydrolyzable chloride of 0.035 weight percent by weight of polyepoxide. The product was heated to vaporize and remove water and obtain a substantially anhydrous reaction mixture. In this situation, then, the bisphenol was dissolved in the diglycidyl ether of bisphenol, and the temperature of the reaction mixture was elevated to 100° C. Thereinto were introduced 0.05 gram sodium hydride, NaH, dissolved in an undetermined minimal amount of dried tetrahydrofuran. Following introduction of the sodium hydride catalyst, the mixture was further stirred and the temperature of the mixture was then elevated to 150° C. and maintained thereat for 15 minutes. Heating was thereafter discontinued, and products permitted to cool towards room temperature. At the end of an hour after the beginning of heating, the reaction vessel contained a clear product which was analyzed and found to be a polyepoxide curable to obtain an epoxy resin and having an epoxide equivalent weight of 480.

EXAMPLE 2

The procedures in the instant example were substantially a repetition of those described in Example 1 except that the starting materials were 390 grams of the diglycidyl ether of bisphenol A, and 110 grams of bisphenol A, reaction between which was catalyzed, following dehydration, by the introduction of 0.15 gram sodium ethoxide, $NaOC_2H_5$ dissolved in dry tetrahydrofuran.

The product of reaction was substantially transparent and colorless, and was found, upon analysis, to have an epoxide equivalent weight of 475.

EXAMPLE 3

The procedures of Example 1 were substantially repeated. Dehydration of the reactant substances was carried out by heating them together in the reaction vessel at 90° C. for a half hour, under substantially subatmospheric pressure ("vacuum"), and trapping and separating water condensate thereby removed. The employed bisphenol was bisphenol A previously purified to obtain a starting material of maximum clarity.

Catalyst was 0.1 gram sodium methoxide in nine times its weight anhydrous methanol as solvent. Reaction temperature was 90° C. and reaction was carried out under subatmospheric pressure. Following twenty minutes of reaction under the indicated conditions, the contents of the reaction vessel were then heated to 160° C. under blanket of nitrogen gas, and, in reaction at 160° C. an exothermic reaction occurred as a result of which the reaction vessel contents temperature increased spontaneously by five degrees.

After three hours and five minutes from the beginning of the heating in the presence of catalyst, a sample of the resulting product was examined, and found to be clear and colorless, to have contents of ionic chloride less than 30 parts per million and a total chloride content of 230 parts per million; and the product had an epoxide equivalent weight of 455.

EXAMPLE 4

In the present example, the procedures followed were the same as those, foregoing, except that the reactants involved were 168 grams bisphenol A, 332 grams of the diglycidyl ether of bisphenol A, and 0.1 gram potassium methoxide dissolved in 17 cubic centimeters of a mixture of benzene and methanol in equal weights with five cubic centimeters dimethoxy propane added thereto. The starting diglycidyl ether of bisphenol A contained 0.124 percent hydrolyzable chloride, ionic chloride less than 20 parts per million, and 0.36 weight percent volatiles by weight of said ether. The materials were mixed and stirred together except for potassium methoxide solution and heated for 90 minutes at 95° C. under a pressure of eight millimeters mercury absolute, to vaporize and remove water that might be present. Catalyst was then added thereto, and the contents maintained under the indicated conditions for 45 minutes further. The temperature of the reaction vessel contents was then raised to 155° C. under a blanket of gaseous nitrogen. At the reaction temperature a rise of eight degrees from exothermy of reaction was noted. Reaction was continued for 270 minutes and the product then examined and found to be a clear, colorless, curable polyepoxide having an epoxy equivalent weight of 1600, ionic chloride contents of less than 40 parts per million.

The resins of relatively high molecular weight and good clarity prepared according to the examples, foregoing, were studied, were compared with one another, and were compared with commercial resins of comparable molecular weight which might be regarded as candidates for competition, as to the ability of the resin, in an appropriate solvent dispersion, to maintain a suspension of representative pigment materials. The representative pigment materials employed included titanium dioxide, which, by reason of its high refractive index, especially in the rutile form here employed, is vividly white; and, for contrast, black iron oxide. The resins of the foregoing examples and a resin of the prior art were placed in a closed jar, employing, typically, 45 grams of resin, 15 grams methyl isobutyl ketone, 15 grams toluene, and 15 grams diacetone alcohol, the last three substances as solvents. To such mixture typically were added 50 grams titanium dioxide and 4 grams black iron oxide; the resulting mixture placed in an 8 ounce wide mouth jar together with porcelain spheres for grinding, and the jar closed. Thereafter, the resin-solvent mixture in the closed jar with the porcelain balls, in the presence of pigment materials, was placed upon corotating rollers and rolled for 22 hours to more finely subdivide pigment materials and achieve a dispersion of pigment throughout the resin, uniformly. At the end of 22 hours of corrasive rolling, the jars were removed from the rollers and the contents examined, and in particular, the separation time of the pigments determined. It was ascertained that the pigments remained in apparently homogeneous suspension in the resins of Examples 1, 2, and 3 when prepared according to the present invention for a substantially longer time than when employing a resin of the prior art, a substance of structure apparently substantially similar to that attained here, but prepared in a reaction that was catalyzed, between bisphenol and its diglycidyl ether, in epichlorohydrin, by the use of N-methylmorpholine. (The prior art resin is a commercial product, D.E.R. 661.)

I claim:

1. In the process of reacting a diglycidyl ether of bisphenol with a bisphenol to obtain a curable polyepoxide higher in equivalent weight than the starting diglycidyl ether of bisphenol, the improvement which comprises employing, as a reaction catalyst, a hydride of an alkali metal or an alkaline earth metal, or an alkali metal or alkaline earth metal lower alkoxide.

2. The process of claim 1 wherein the bisphenol is bisphenol A and the diglycidyl ether of bisphenol is the diglycidyl ether of bisphenol A.

References Cited

UNITED STATES PATENTS

| | | | |
|---|---|---|---|
| 2,506,486 | 5/1950 | Bender et al. | 260—47 |
| 2,990,396 | 6/1961 | Clark et al. | 260—47 |
| 3,336,257 | 8/1967 | Alvey | 260—47 |
| 3,306,872 | 2/1967 | Maycock et al. | 260—32.8 |

OTHER REFERENCES

Chemical Abstracts 53, 17559e (1959), Lidarik.

WILLIAM H. SHORT, Primary Examiner

E. A. NIELSEN, Assistant Examiner

U.S. Cl. X.R.

260—47EP